United States Patent [19]
Brettrager

[11] 3,873,800
[45] Mar. 25, 1975

[54] LONGHOLE ELECTRIC DISCHARGE MACHINING APPARATUS

[76] Inventor: Henry J. Brettrager, 5410 East St., Saginaw, Mich. 48601

[22] Filed: Jan. 2, 1974

[21] Appl. No.: 406,562

[52] U.S. Cl. ............ 219/69 E, 219/69 M, 219/69 V
[51] Int. Cl. ............................................. B23p 1/08
[58] Field of Search ... 219/69 M, 69 V, 69 E, 69 R, 219/69 G

[56] References Cited
UNITED STATES PATENTS
2,974,216   3/1961   Inove ................................ 219/69 V
3,385,947   5/1968   Inove ................................ 219/69 V

*Primary Examiner*—Bruce A. Reynolds
*Attorney, Agent, or Firm*—Learman & McCulloch

[57] ABSTRACT

Electric discharge machining apparatus and methods, particularly suited to enlarging an elongate opening or bore in an electrically conductive workpiece, wherein a longitudinally movable carriage supports the workpiece in a tank which is filled with dielectric machining liquid to a level above the level of the opening. An elongate strain rod, which may be removably coupled to the tank end walls, extends longitudinally through the opening and mounts an electric discharge machining electrode in axial alignment with the bore. An electromachining source of power is connected to the workpiece and the electrode for eroding the workpiece to enlarge the bore to precise configuration as the carriage moves the workpiece axially relative to the electrode.

7 Claims, 10 Drawing Figures

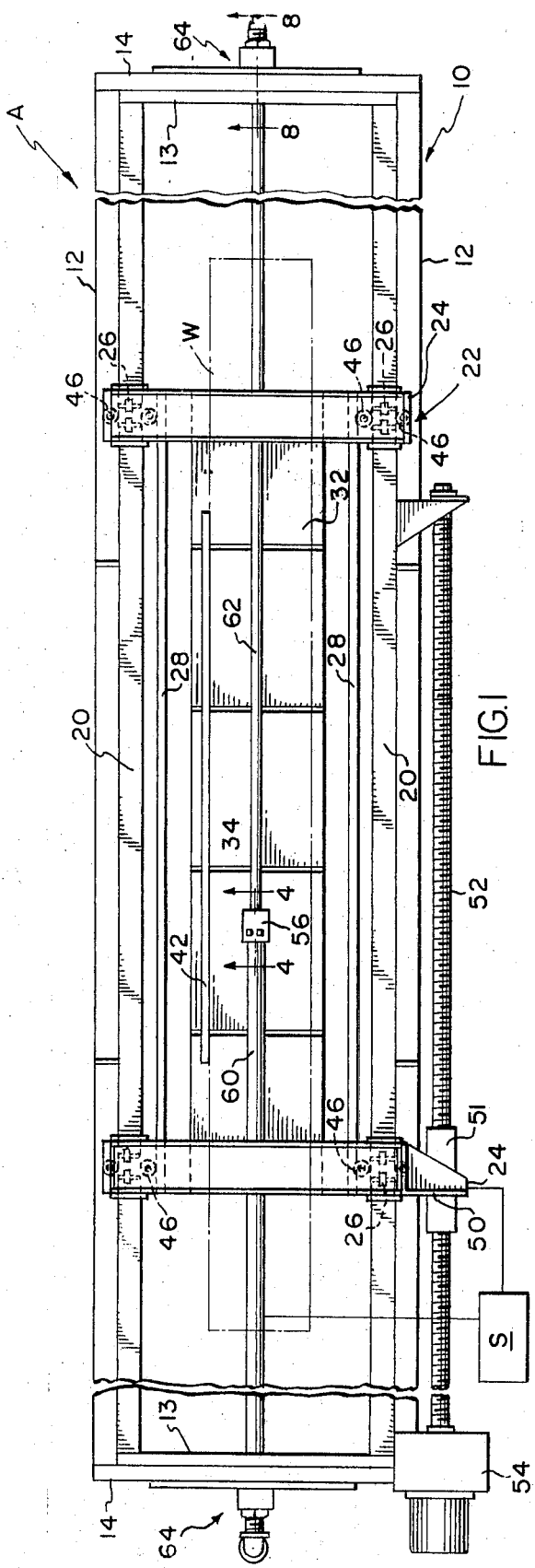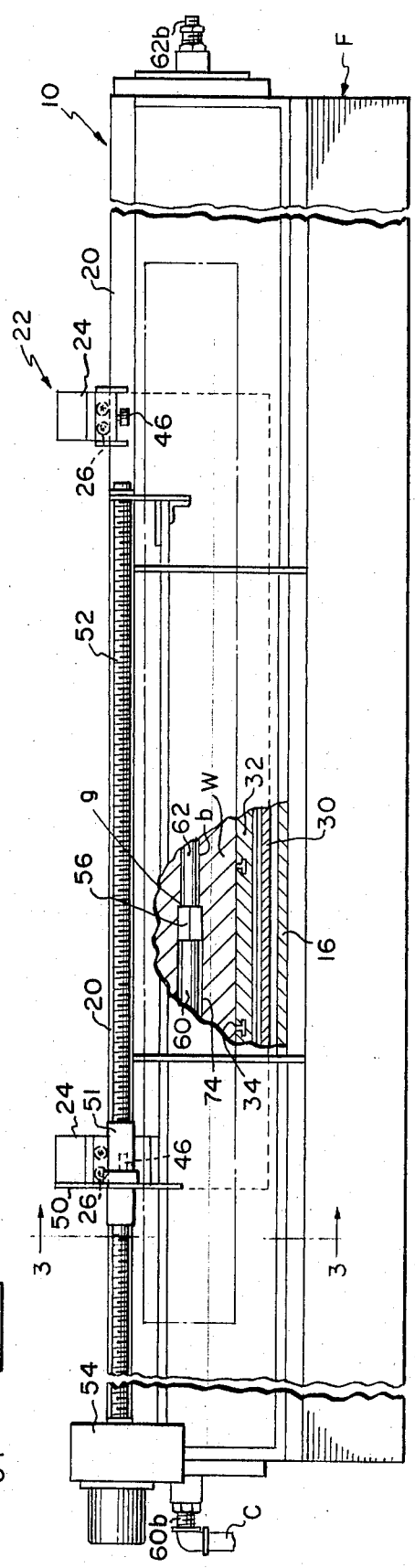

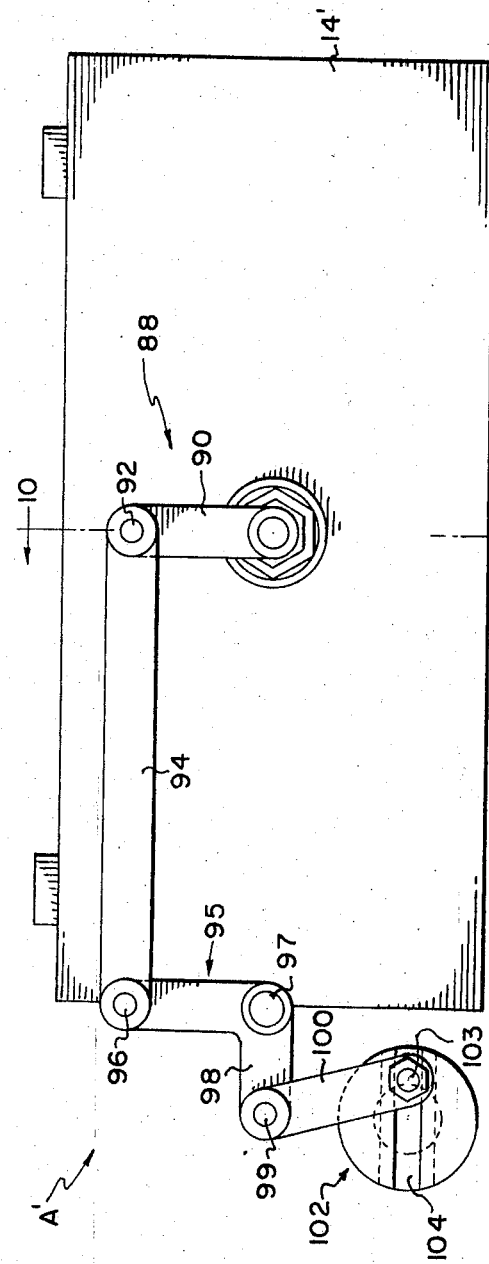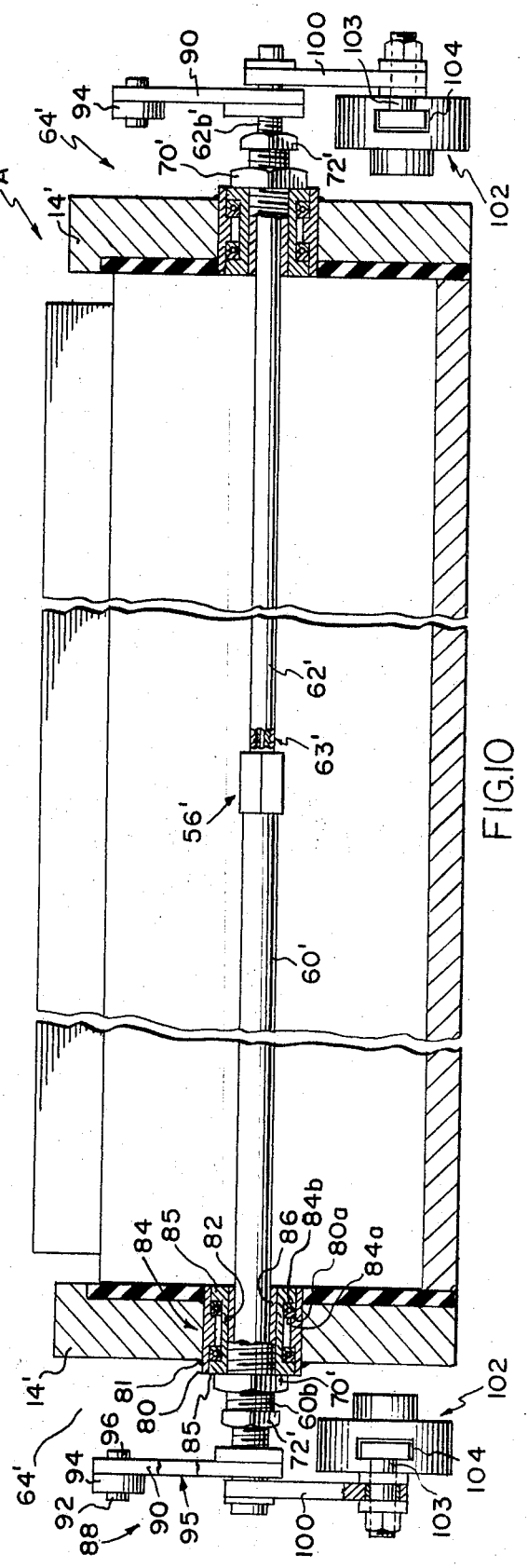

LONGHOLE ELECTRIC DISCHARGE MACHINING APPARATUS

BACKGROUND OF THE INVENTION

This invention relates to the electromachining of an electrically conductive workpiece and more particularly to longhole electric discharge machining methods and apparatus for moving an electrically conductive workpiece in a machining path of travel relative to a machining electrode that is mounted between the end walls of an elongate tank which is filled with electromachining liquid to a level above the electrode.

In the machining of long bores in long workpieces, conventional machining techniques are not always satisfactory, particularly if non-circular or irregularly shaped holes are to be machined. It has been found that non-circular and irregularly shaped, elongate bores can be provided in long workpieces by electromachining apparatus having electrodes of matching configuration.

It is important that the bores be accurately machined as workpieces comprising nine-foot bars of stainless steel, for example, are too expensive to be scrapped. To accurately machine a bore with an electromachining electrode, it is important that the electrode not vibrate during machining. Accordingly, it is an object of the present invention to provide electromachining apparatus which is constructed to insure that the machining electrode does not vibrate during the machining pass of the workpiece.

It is another object of the present invention to provide electromachining apparatus and methods for enlarging an elongate bore in a workpiece which is moved by a workpiece carrier relative to a longitudinally stationary electrode mounted on a strain rod structure which passes through the bore in the workpiece.

Still another object of the present invention is to provide electromachining apparatus which mounts a machining electrode on a strain rod structure held in tension between the end walls of a dielectric liquid containing tank.

A further object of the present invention is to provide electromachining apparatus and methods wherein, alternatively, an oscillating, electromachining electrode may be provided for machining irregularly shaped holes in a longitudinally moving workpiece.

Other objects and advantages of the present invention will become apparent to those of ordinary skill in the art as the description thereof proceeds.

SUMMARY OF THE INVENTION

Electromachining apparatus for providing an elongate bore in an electrically conductive workpiece wherein the workpiece is moved toward a longitudinally stationary electromachining electrode.

The present invention may more readily be understood by reference to the accompanying drawings, in which:

FIG. 1 is a top plan view of electric discharge machining apparatus constructed according to the present invention;

FIG. 2 is a side elevational view of the apparatus illustrated in FIG. 1, part of an electromachining tank being broken away to more clearly illustrate the electromachining electrode;

FIG. 9 is an end elevational view of a slightly modified construction; and

FIG. 10 is a sectional side view of the modified construction, taken along the line 10—10 of FIG. 9.

DESCRIPTION OF THE PREFERRED EMBODIMENT

Figure 8:
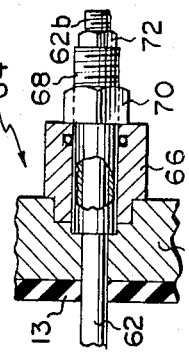
FIG. 8 is a sectional side view, particularly illustrating one of the end mount members for the strain rods, taken along the line 8—8 of FIG. 1.
Figure 3:
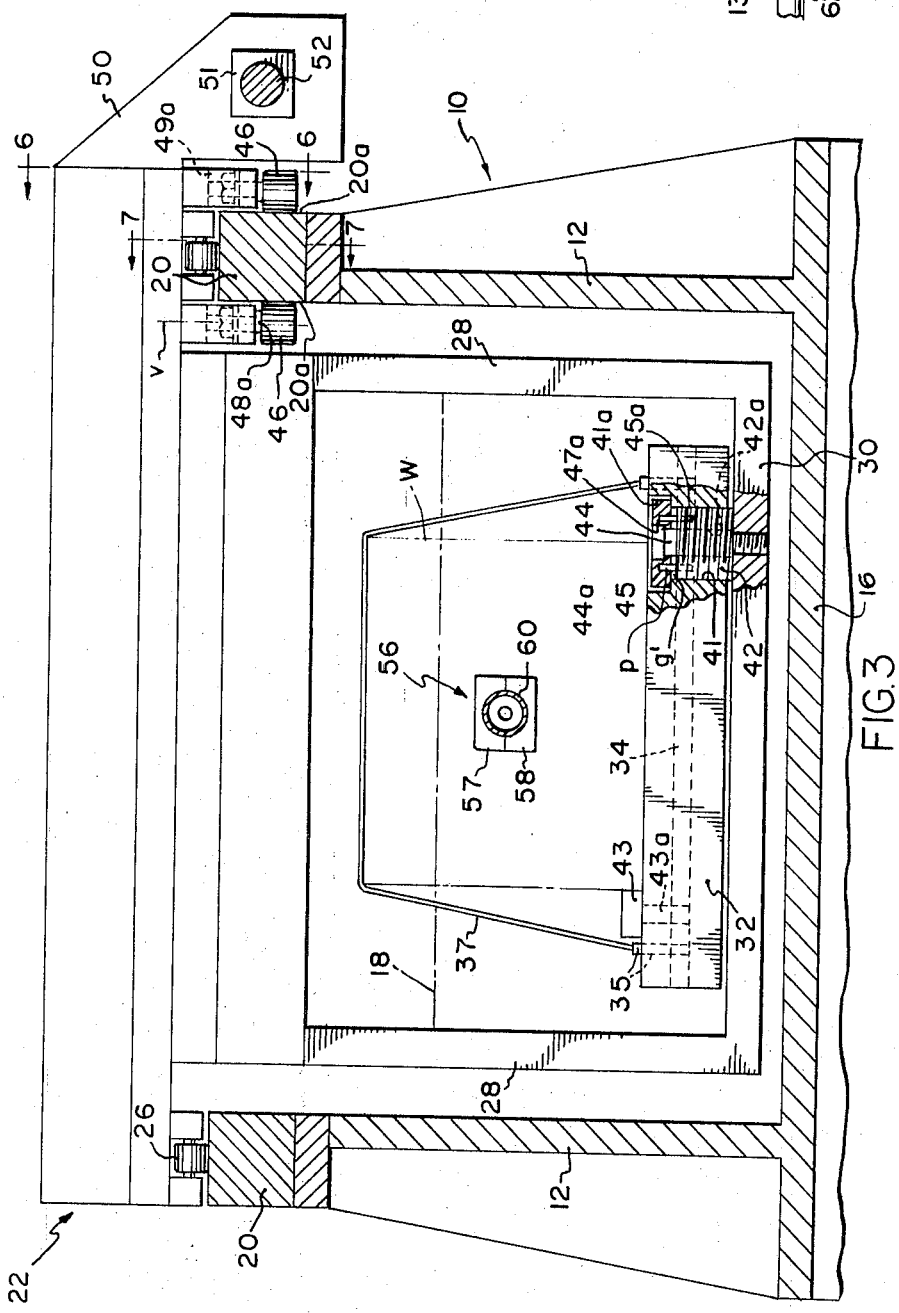
FIG. 3 is an enlarged, sectional end view taken along the line 3—3 of FIG. 2.

Electromachining apparatus constructed according to the present invention is generally designated A and is particularly adapted for enlarging an elongate, generally circular bore $b$, provided in an elongate, electrically conductive workpiece, generally designated W. The electromachining apparatus A is mounted on a frame, generally designated F, and includes an open top tank, generally designated 10, having side walls 12 spanned by end walls 14 and a bottom wall 16. The tank 10 is at least partially filled with dielectric machining liquid 18 (FIG. 3) which is recirculated through filters (not shown) to remove the sludge and material that is eroded from the workpieces W in a manner to be later described. The machining liquid 18 may comprise any of the commercially available EDM dielectric oils. The inside surfaces of the end walls 14 are lined with electrical insulation liners 13 (FIGS. 1 and 8) which electrically insulate the end walls 14 from the side walls 12 and bottom wall 16 for a purpose to become apparent.

Figure 6:
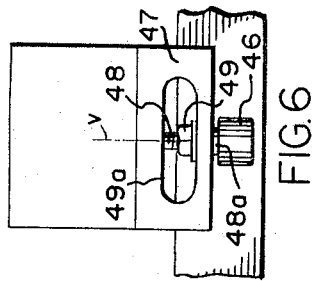
FIG. 6 is an enlarged side view, particularly illustrating workpiece carriage guide rollers, taken along the line 6—6 of FIG. 3.
Figure 7:
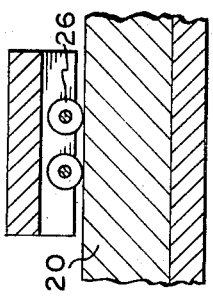
FIG. 7 is a sectional side view, taken along the line 7—7 of FIG. 3.

The tank side walls 12, which are at least twice the length of a workpiece W, mount longitudinal guide rails 20 (FIGS. 2 and 3) supporting a longitudinally translatable workpiece carriage, generally designated 22. The work carrier 22 includes a pair of longitudinally spaced end frame members 24, having pairs of caster rollers 26 (FIG. 7) riding along the top surfaces of the rails 20, supporting longitudinal carrier walls 28 (FIG. 3) which are partially immersed in the dielectric liquid 18. The lower ends of the carrier side walls 28 are spanned by a lower carrier wall 30 carrying a workpiece mounting block 32 which supports the workpiece W. A plurality of inversely disposed, transversely extending, T-slots 34 (FIG. 2) are provided in the workpiece mounting block 32 to permit mounting of the workpiece W via complementally formed tie-down clamps 35 (FIG. 3) which are received in the T-slots 34 and are fixed to opposite ends of a plurality of tie-down straps 37 overlying the workpiece W.

The workpiece mounting block 32 is vertically adjustable on the lower carrier wall 30 by a plurality of cylindrical jackscrews 42, threaded in apertures 41 provided in the workpiece mounting block 32. Each jackscrew 42 is provided with a bore 42a receiving a clamping bolt 44 which is threaded in the lower carrier wall 30. The threaded apertures 41 are counterbored at 41a to receive rotatable clamping plates 45 which are bored at 47 to receive the bolts 44 and counterbored at 47a to receive the enlarged boltheads 44a of the bolts 44. The mounting block clamping plates 45, which are separated from the jackscrews 42 by vertical gaps g, are coupled thereto by vertical pins p depending from the clamping plates and freely received in complemental, vertical recesses in the upper ends of the jackscrews 42. When the clamping bolts 44 are unthreaded, the jackscrews 42 are released for rotation by the clamping plates 45 to vertically adjust the workpiece mounting block 32 so that the workpiece W will be precisely positioned on the carrier 22. After adjustment, the clamping bolts 44 are again tightened to remove any "play" so that the workpiece W will not vibrate during machining. One or more longitudinally extending, workpiece aligning bars 43 (FIG. 3) are mounted along at least one side of the mounting block 32 by inverted T-mounts 44 received in the T-slots 34.

Depending from the carriage end rails 24 on laterally opposite sides of one of the support rails 20 are guide roller mounting bars 47 mounting threaded rods 48 by nuts 49 received in slots 49a provided in the mounting bars 47. The threaded rods 48, which are rotatable about their vertical axes v when the nuts 49 are unturned, include eccentric portions 48a journaling guide rollers 46 bearing against opposite sides 20a of the guide rails 20. By loosening the nuts 48, the rollers 46 can be rotated about the axes v of the rods 48 to preload the guide rollers 46 against the sides 20a of the rails 20 and prevent lateral shifting of the carriage 22 as it moves longitudinally.

Figure 5:
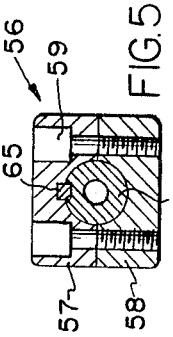
FIG. 5 is an enlarged sectional end view of the electromachining electrode, taken along the line 5—5 of FIG. 4.
Figure 4:
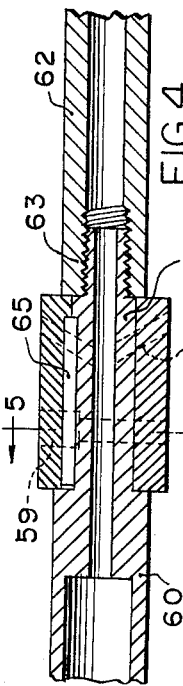
FIG. 4 is an enlarged, sectional side view particularly illustrating an electromachining electrode, taken along the line 4—4 of FIG. 1.

For longitudinally moving the workpiece supporting carriage 22 in a longitudinal path of travel, the carriage 22 includes laterally extending guide members 50 having nut portions 51 threadedly receiving an axially stationary, rotatable, threaded screw 52 which is driven by a commercially available, electrical servo-motor 54 supported by one of the tank side walls 12. As the translating screw 52 is rotated, the work carrier 22 is longitudinally translated. For eroding the workpiece W to enlarge and change the configuration of the circular bore b to a rectangular bore 74, a generally rectangular, commercially available electric discharge machining (EDM) electrode, generally designated 56, is supported in the tank 10 by a pair of axially extending, elongate, strain rods 60 and 62 which are threadedly coupled together at 63 (FIG. 4) and span the tank end walls 14. As is best illustrated in FIGS. 4 and 5, the electromachining electrode 56 includes a pair of electrically conductive electrode halves 57 and 58 clamped together and to opposite sides of a reduced diameter portion 60a of the strain rod 60 by bolts 59. The top electrode half 57 is keyed at 63 to the strain rod portion 60 a to prevent rotation of the electrode 56 about the axis of the strain rod 60. The electrode supporting, strain rods 60 and 62 are hollow to minimize their weight, which otherwise tends to cause sagging thereof, without significantly reducing their strength. The workpiece bore b is of such size as to freely receive the smaller diameter electrode supporting rod 62 which is coupled to the other electrode supporting strain rod 60 only after it is passed through the bore b.

End mount members, generally designated 64, are provided to exert sufficient axial tensioning force on the electrode support rods 60 and 62 to maintain the rods 60 and 62 horizontally linear and to prevent them from bowing and vibrating. This will eliminate machining inaccuracies otherwise resulting from a vibrating electrode. The end mount members 64 (FIG. 8) include rotatable adjustment blocks 66 freely receiving sleeves 68 which are externally threaded to receive tension adjusting nuts 70. The nuts 70 react between the sleeves 68 and the blocks 66 to force the sleeves 68 against stop nuts 72 threaded on the electrode mounting strain rods 60 and 62 and longitudinally stress the strain rods 60 and 62 in opposite directions. This stressing will materially prevent vibration of the rods 60 and 62 and the electrode 56.

An electromachining source of electrical power, schematically designated S, is connected across the electromachining electrode 56 and the workpiece W to periodically establish pulses of electrical discharge current across the gap g (FIG. 2) separating the workpiece and the electrode 56.

A typical EDM power supply unit for this purpose is supplied by Esco-Sparcatron, Inc. of Ann Arbor, Mich., U.S.A. and includes a conventional control connected with feed motor 54 for maintaining a feed rate which keeps the electrode 56 typically spaced from the workpiece by a 0.003 inch gap g, for example. The electrical insulation 13 between the tank end walls 14, mounting the electrode 56, and the tank side walls 12 and bottom wall 16 prevents short circuiting of the source 72.

Machining liquid 18 is also supplied to the gap g between the electrode 56 and the workpiece W via the hollow strain rods 60 and 62 coupled at their axially outer ends 60b and 62b to liquid supply conduits C (FIG. 2). Ports 60c in the electrode 56 and the rod end 60a of the strain rod 60 pass the dielectric liquid 18 to the gap g to wash the eroded material away from the gap g, into the tank.

THE OPERATION

To condition the workpiece W for machining, the operator pre-drills, with conventional drilling machinery, a circular bore b, of a diameter large enough to pass the strain rod 62, lengthwisely through the elongate workpiece W. The strain rod 62 is initially uncoupled from the strain rod 60 and the righthand (FIG. 1) end mount member 64, removed from the tank 10, and inserted in the workpiece bore b. The axially outer, or right, end of the rod 62 is then passed through one of the openings 14b provided in the tank end walls 14 and the axially inner end of rod 62 is coupled to the other strain rod 60 at 63. The righthand (FIG. 1) end mount member 64 is then threaded on the axially outer end of the rod 62 to exert axial tensioning force on the strain rods 62 to insure that the rods 60 and 62 are linear and do not sag at the mid-portion 63. The electromachining electrode halves 57 and 58 are then clamped to each other and to opposite sides of the strain rod 60 by bolts 59. Upon actuation of the servo-motor 54, the work support carriage 22 is moved from right to left (FIG. 1) to maintain the gap g at 0.003 inches, for example. The source 72 is operative to establish an impulsive electrical discharge between the machining electrode 56 and the workpiece W to erode the material and suspend it in the dielectric liquid 18. The eroded material is washed out of the gap by machining liquid flowing in the electrode support rods 60 and 62. The electrode 56, which is rectangular in end cross section, will machine an elongate, rectangular opening 74 completely through the workpiece W as the workpiece W moves with the carrier from right to left in FIG. 3.

ALTERNATE EMBODIMENT

Apparatus, generally designated A' is illustrated in FIGS. 9 and 10 for enlarging the bore b of the workpiece W and for electric discharge machining an enlarged, irregularly shaped, e.g., pre-shaped, elongate bore. The apparatus A' comprises oscillatable electrode mounting rods 60' and 62' removably coupled to each other at 63', and rotatably received in end mounts, generally designated 64'. An electric discharge machining electrode 56' is mounted on a strain rod 60' as previously described. The end mounts 64' comprise cylinders 80, welded at 81 to the tank end walls 14, mounting bearing assemblies 84 which journal bushings 82 having axially spaced end flanges 85. The bearing assemblies 84 include stationary, axially inner races 84a bearing against axial shoulders 80a, provided on the cylinders 80, and axially outer races 84b bearing against the end flanges 85 of the bushings 82 for rotation therewith.

The bushings 82 mount sleeves 86 which freely receive the strain rods 60' and 62'. The ends 60b' and 62b' of the rods 60' and 62', respectively, threadedly receive stop nuts 72' which abut the bushings 86 to axially hold the rods 60' and 62' in position. Tension adjusting nuts 70' are threaded on the ends of the sleeves 86 to force them axially outwardly against the stop nuts 72' to exert tensioning force thereon.

A drive assembly, generally designated 88 (FIGS. 9 and 10), is provided at each end of the tank 10 for oscillating the electrode 56' in a to-and-fro swinging path of travel about the longitudinal axis of the strain rods 60' and 62'. The drive assembly 88 includes upstanding links 90 fixed to the axially outer ends 60b' and 62b' of the rods 60' and 62'. Each link 90 is pivotally connected at 92 to a link 94 which is pivotally connected at 96 to one arm of a bell crank 95 swingably mounted on a frame supported pivot pin 97. The other arm 98 of the bell crank 95 is pivotally connected at 99 to a pitman rod 100 which is swingably connected to an axially extending rod or pin 103 received in a slot 104 (FIG. 10) of a common, rotating crank, generally designated 102, located midway between the ends of the tank. The bell cranks 95 are thus concurrently driven in synchronism by the same crank or eccentric 102. The positions of the connector pins 103 in the slots 104 can be varied to vary the length of the crank and the amplitude of the electrode stroke.

As the workpiece W is moved longitudinally, the electromachining electrode 56 is oscillated in a to-and-fro swinging path of travel to machine an axial bore, having an irregular end cross section, in the workpiece.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. Electric discharge machining apparatus for enlarging a passage extending entirely longitudinally through an elongate workpiece comprising a tank containing a body of electromachining fluid, carriage means for supporting and moving the workpiece along a given path through said tank with the passage immersed in said body of fluid, a machining electrode having a transverse cross section related to that of the enlarged passage to be formed in said workpiece, elongate support means mounted upon and extending between opposite walls of said tank and extending through said passage means coupling said electrode to said support means to support said electrode in said tank at a fixed position upon said given path such that movment of said workpiece along said path causes said electrode to be passed through said passage, and means on said support means for establishing an electrical potential difference between said electrode and said workpiece.

2. Apparatus as defined in claim 1 further comprising means in said support means for discharging a flow of electromachining fluid from said electrode into said passage to flush eroded material from said passage during the machining operation.

3. Apparatus as defined in claim 1 wherein said support means comprises a pair of elongate rod members, means for detachably coupling said rod members to each other and to said electrode, and means for placing said rod members in tension between opposed sides of said tank with said electrode supported by said rod members midway between said opposed sides beneath the surface of said body of fluid.

4. Apparatus as defined in claim 3 wherein said passage is a bore extending longitudinally of said workpiece and said rod members extend horizontally and coaxially of said bore, and means operable during movement of said carriage for oscillating said electrode about the axis of said bore.

5. Apparatus as defined in claim 3 wherein said rod members are coupled in coaxial end to end relationship with each other with said electrode being cooperatively supported on said rod members adjacent the joined ends of said rod member, each of said rod members having a length equal to or greater than the length of said passage in said workpiece.

6. Apparatus as defined in claim 5 wherein said rod members project outwardly through sealed openings in said opposed sides of said tank, means at the exterior of said tank for placing said rod members in tension, means defining a discharge passage in said electrode, at least one of said rod members having a flow passage therethrough communicating with said discharge passage and the exterior of said tank.

7. Apparatus as defined in claim 6 wherein said electrode comprises a pair of split portions removably clamped to opposite sides of said rod members.

* * * * *